Sept. 16, 1924. Re. 15,917

A. H. SKAER ET AL

REVERSIBLE DRUMS

Original Filed Sept. 12, 1922 2 Sheets-Sheet 1

Inventors,
Arthur H. Skaer;
Theodore E. Barker;
Omar E. Clark.

By

Attorney

Sept. 16, 1924. Re. 15,917
A. H. SKAER ET AL
REVERSIBLE DRUMS
Original Filed Sept. 12, 1923 2 Sheets-Sheet 2
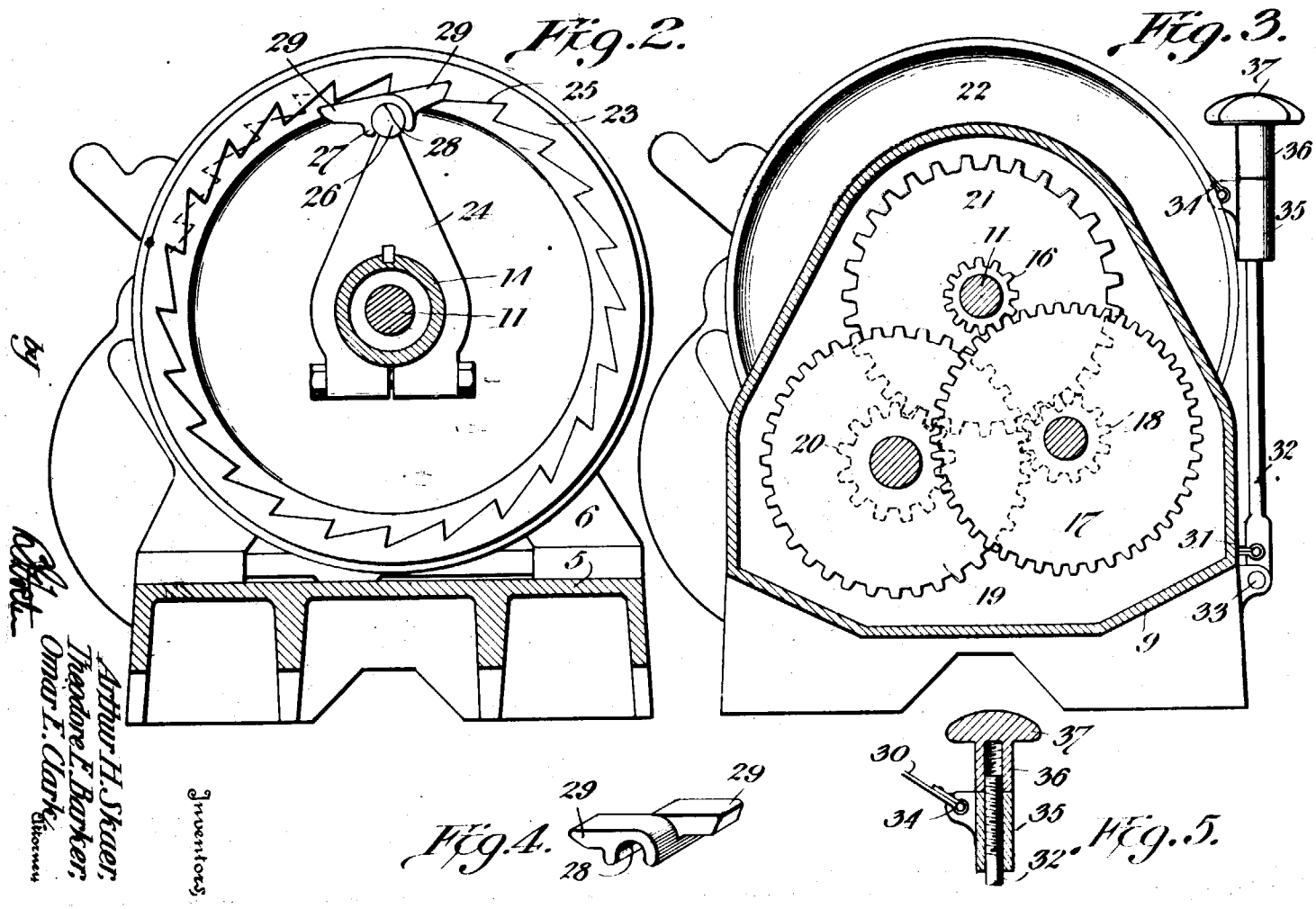
Inventors,
Arthur H. Skaer,
Theodore E. Barker,
Omar E. Clark,
by Attorneys Reissued Sept. 16, 1924.

Re. 15,917

UNITED STATES PATENT OFFICE.

ARTHUR H. SKAER, THEODORE E. BARKER, AND OMAR E. CLARK, OF DENVER, COLORADO, ASSIGNORS TO THE DENVER ROCK DRILL MANUFACTURING COMPANY, OF DENVER, COLORADO, A CORPORATION OF DELAWARE.

REVERSIBLE DRUMS.

Original No. 1,458,554, dated June 12, 1923, Serial No. 587,803, filed September 12, 1922. Application for reissue filed July 29, 1924. Serial No. 728,989.

*To all whom it may concern:*

Be it known that we, ARTHUR H. SKAER, THEODORE E. BARKER, and OMAR E. CLARK, citizens of the United States, residing at Denver, in the county of Denver and State of Colorado, have invented certain new and useful Improvements in Reversible Drums, of which the following is a specification.

The present invention relates to winding drum mechanism of the type in which two drums are employed, driven from a common prime mover.

The preferred embodiment of the invention is illustrated in the accompanying drawings, wherein:—

Figure 2 is a cross sectional view on the line 2—2 of Figure 1,

Figure 3 is a similar view on the line 3—3 of Figure 1.

Figure 4 is a detail perspective view of the pawl,

Figure 5 is a detail perspective view of the actuating means for one of the brake drums.

Figure 1:
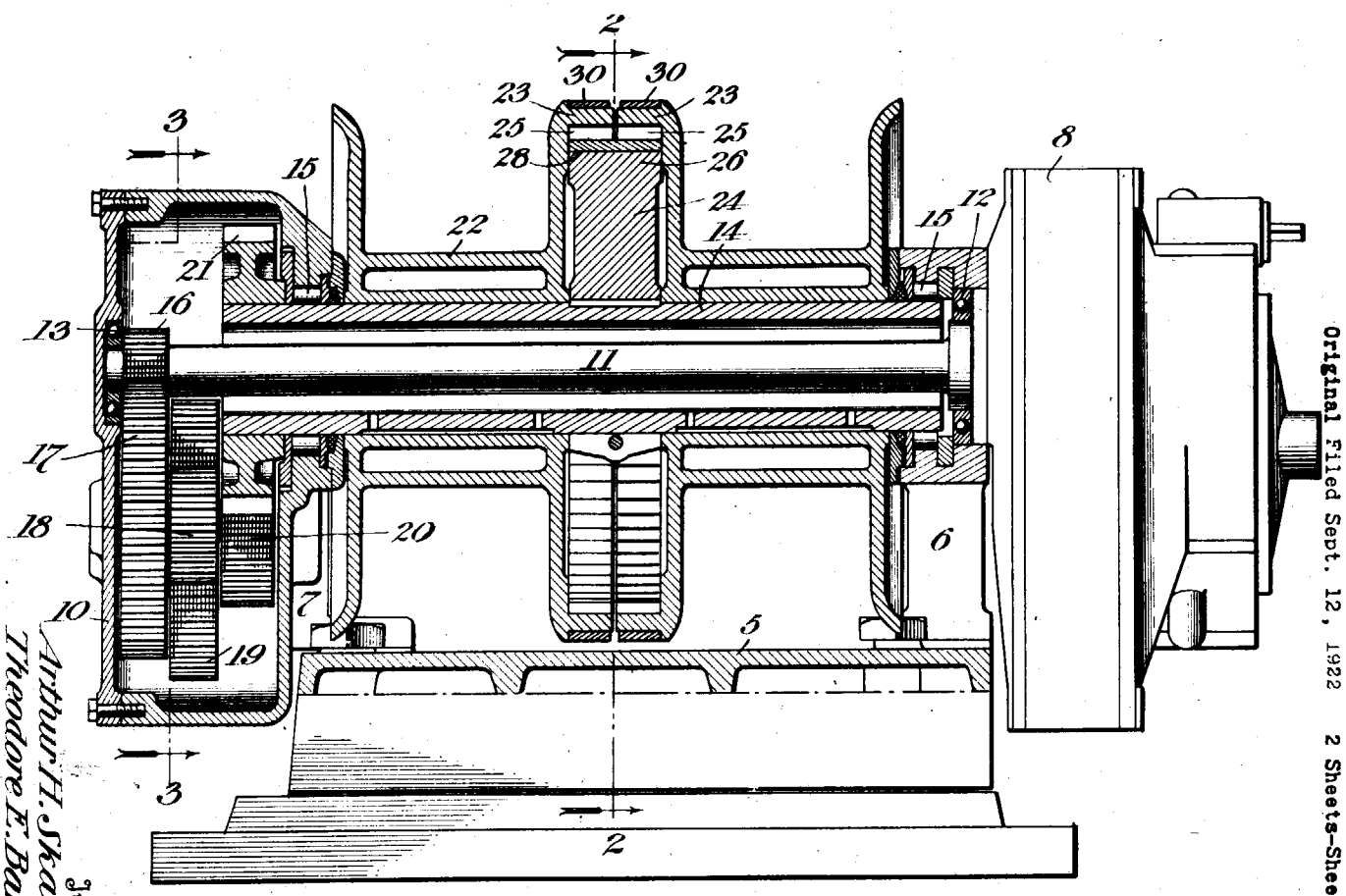
Figure 1 is a longitudinal sectional view through the improved structure.

In the embodiment disclosed, a base 5 is employed having spaced supports 6 and 7. The support 6 carries a suitable reversible motor 8, which may be of any well known or desired character. The support 7 is provided with a gear casing 9 having a removable cover plate 10.

Extending between the supports 6 and 7 and operated by the motor 8 is a motor shaft 11 having an anti-friction bearing 12 in the support 6 adjacent to the motor 8 and having an anti-friction bearing 13 in the cover plate 10. This shaft is surrounded by a tubular shaft 14 having roller bearings 15 in the supports 6 and 7. The shaft 11 carries a pinion 16 meshing with a gear 17 that is located in the gear case 9 and said gear 17 has secured thereto a pinion 18 meshing with a gear 19 that is fixed with relation to a pinion 20. The pinion 20 is in mesh with a gear wheel 21 fixed to the tubular shaft 14. It will thus be evident that the shaft 14 may be driven in either of opposite directions from the motor and at a reduced speed.

Journaled upon the shaft 14 are independent drums 22 having on their adjacent ends flanges 23 forming a housing, within which is rotatably mounted a head 24 carried by the shaft 14. The flanges are provided on their internal annular faces with ratchet teeth 25, the teeth of one drum being set reversely to the teeth of the other, as indicated by the dotted and full lines in Figure 2. It will be noted that the active or abutment faces of the ratchet teeth 25 are not radial to the axis of the drums but are at a backward angle (substantially 15°) to the radial lines. The head 24 terminates in a transverse pivot 26, and mounted thereon is a double pawl 27 that thus turns on an axis parallel to the axes of the shafts and drums. Preferably this pawl has an open-sided socket 28 to receive the pivot 26. The pawl is provided with opposite offset teeth 29, each of which coacts with the opposite ratchet teeth of the drum flanges. It will thus be seen that if one of the teeth 29 is in interlocked abutting relation with one of the teeth 25 of one of the drums, the other tooth 29 will be out of coaction with the oppositely set teeth of the other drum and vice versa. It will furthermore be apparent that if the shaft 14 is rotated in one direction one of the drums will be clutched thereto while the other will be free. Upon a reverse rotation of the shaft the pawl will automatically swing so as to bring the other tooth into coaction with the ratchet teeth of the other drum while the first mentioned pawl tooth will be released and the drum is free to rotate.

The specific construction of the pawl and pawl mounting and the relation of the teeth with respect thereto are important. It will be noted that the pawl has a relatively free swinging movement on the arm and that, as shown in Figure 2, when a tooth of the pawl is completely seated at the root of one of the ratchet teeth 25, the limit of the swinging movement of said pawl has not been reached. The arm 24 and pawl therefore act as a toggle. Consequently when a reversal of the direction of rotation of the motor takes place and the pawl shifts from the ratchet tooth of one drum and engages with a tooth of the other drum, this toggle action causes a positive wedging action to take place and the aforesaid inclination of the teeth insures the pawl tooth to completely enter the interdental space and thus secures a complete bearing between the pawl and ratchet tooth. The possibility of a clutching action taking place and being maintained at the ends of the teeth is thus minimized and the toggle or wedging action maintains the complete engagement as long as the parts are in driving connection. Moreover this complete engagement will always take place irrespective of wear or discrepancies in the formation of different teeth.

It is furthermore to be noted by reference to Figure 2 that the teeth 29 of the pawl 27 are so related to the ratchet teeth 25 that when the change takes place the pawl tooth 29 moving into action is engaged with its ratchet tooth before the other pawl tooth 29 is disengaged from the inclined face of the other ratchet tooth. Consequently a positive change is obtained. Furthermore by reason of the pivotal mounting, as shown, the pivot 26 is behind and in line with the active pawl tooth 29, forming an abutment behind the tooth and in direct line with the pressure exerted on said tooth. This materially lessens the chance of breakage.

In order to control the movement of the drum when free the flanges 23 preferably constitute braking surfaces and brake bands 30 are arranged thereupon. Preferably these brake bands are each connected at one end, as shown at 31, with a rod 32 pivotally mounted, as shown at 33, on the base, while the other end is fastened as illustrated at 34 to a sleeve 35 slidable upon the rod. A nut 36 adjustably threaded on the free end of the rod 32 bears upon the sleeve and is provided with a handle knob 37. By turning this nut the brake band can be tightened or loosened as desired.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What we claim, is:

1. The combination with a pair of oppositely rotatable driven members having internal inset oppositely disposed ratchet teeth, of a driving member common to the driven members and rotatable in opposite directions, and a pawl member rotatable with the driving member and pivoted thereon on an axis substantially parallel to the axis of rotation of the driving member, said pawl member having oppositely disposed teeth that respectively engage the internal ratchet teeth of the driven members accordingly as the driving member is rotated in one direction or the other, and said pawl member having a pivotal movement beyond the limits defined by the ratchet teeth to secure a toggle or wedging action.

2. The combination with a pair of oppositely rotatable driven members having internal inset oppositely disposed ratchet teeth provided with abutment faces that are backwardly inclined to lines radial to the driven members, of a driving member common to the driven members and rotatable in opposite directions, and a pawl member rotatable with the driving member and pivoted thereon on an axis substantially parallel to the axis of rotation of the driving member, said pawl member having oppositely disposed teeth that respectively engage the internal teeth of the driven members accordingly as the driving member is rotated in one direction or the other.

3. The combination with a pair of oppositely rotatable driven members having internal inset oppositely disposed ratchet teeth provided with abutment faces that are backwardly inclined to lines radial to the driven members, of a driving member common to the driven members and rotatable in opposite directions, and a pawl member rotatable with the driving member and pivoted thereon on an axis substantially parallel to the axis of rotation of the driving member, said pawl member having oppositely disposed teeth that respectively engage the internal teeth of the driven members accordingly as the driving member is rotated in one direction or the other, and said pawl member having a pivotal movement beyond the limits defined by the ratchet teeth to secure a toggle or wedging action.

4. The combination with a pair of oppositely rotatable driven members having oppositely disposed ratchet teeth provided with abutment faces that are backwardly inclined to lines radial to the driven members, of a driving member common to the driven members and rotatable in opposite directions, and a pawl member rotatable with the driving member and pivoted thereon on an axis substantially parallel to the axis of rotation of the driving member, said pawl member having oppositely disposed teeth that respectively engage the said abutment faces of the ratchet teeth of the driven members accordingly as the driving member is rotated in one direction or the other.

5. The combination with a pair of oppositely rotatable driven members, of a driving member common thereto and rotatable in opposite directions, an arm rotatable with the driving member and having a pivot formed on its free end, and a clutch member having a socket between its ends in which the pivot is engaged, said clutch member having portions on opposite sides of the socket and substantially in line therewith and with the pivot, that respectively engage the driven members to operate one or the other accordingly as the driving member is turned in one direction or the other.

6. The combination with a pair of oppositely rotatable driven members having internal oppositely disposed ratchet teeth, of a driving member common thereto and rotatable in opposite directions, an arm rotatable with the driving member and having a pivot formed on its free end, and a pawl member having a socket between its ends in which the pivot is engaged, said clutch member having teeth on opposite sides of the socket and substantially in line therewith and with the pivot that respectively engage the ratchet teeth of the members to operate one or the other accordingly as the driving member is turned in one direction or the other.

7. The combination with a reversibly rotatable driving shaft, of alined separate drums rotatable thereabout and having adjacent flanged ends provided with internal inset oppositely disposed ratchet teeth, a head on the shaft extending between the drums within the adjacent flanges thereof, and a double pawl pivoted between its ends on the free end of the head parallel to the axis of the shaft and having oppositely disposed teeth that respectively engage the opposite ratchet teeth of the drums accordingly as the shaft is driven in opposite directions.

8. The combination with a reversibly rotatable driving shaft, of rotatable drums located end to end and rotatable about the driving shaft, said drums being provided on their adjacent ends with ratchet teeth, the teeth of one drum having abutment faces disposed oppositely to the teeth of the other drum and backwardly inclined at an angle to the radial lines of the drums, and a double pawl having a pivotal mounting on the shaft between the drums, the pivot axis of said pawl being substantially parallel to the axis of the driving shaft, said pawl having oppositely extending teeth that respectively engage the inclined faces of the ratchet teeth of the drums accordingly as the shaft is rotated in one direction or the other.

9. The combination with a reversibly rotatable driving shaft, of rotatable drums located end to end and rotatable about the driving shaft, said drums being provided on their adjacent ends with ratchet teeth, the teeth of one drum having abutment faces disposed oppositely to the teeth of the other drum and backwardly inclined at an angle to the radial lines of the drums, an arm carried by the shaft and located between the drums, and a double pawl having a pivotal mounting on the free end of the arm, the pivot axis of said pawl being substantially parallel to the axis of the driving shaft, said pawl having oppositely extending teeth that respectively engage the inclined faces of the ratchet teeth of the drums accordingly as the shaft is rotated in one direction or the other, and said pawl being capable of pivotal movement beyond the limits defined by the final engagement of the pawl teeth with the bases of the ratchet teeth.

10. The combination with a driving shaft, of rotatable drums journaled on the shaft and located end to end, the adjacent ends of said drums having flanges provided with internal oppositely disposed ratchet teeth that have backwardly inclined abutment faces, an arm mounted on the shaft between the drums and having a terminal pivot substantially parallel to the shaft, and a double pawl having a socket between its ends that receives the pivot, said pawl having oppositely extending teeth in line with the pivot and respectively engaging the ratchet teeth of the drum flanges, accordingly as the shaft is rotated in one direction or the other, the said pawl teeth being so related to the ratchet teeth that on the pivotal movement of the pawl, the tooth thereof moving into action is engaged with a ratchet tooth before the other pawl tooth is disengaged.

ARTHUR H. SKAER.
OMAR E. CLARK.
THEODORE E. BARKER.